United States Patent [19]

Melzer et al.

[11] 4,104,226

[45] Aug. 1, 1978

[54] RETENTION AIDS AND FLOCCULANTS BASED ON POLYACRYLAMIDES

[75] Inventors: Jaroslav Melzer, Ludwigshafen; Hans-Uwe Schenck, Frankenthal, both of Fed. Rep. of Germany

[73] Assignee: BASF Aktiengesellschaft, Ludwigshafen, Fed. Rep. of Germany

[21] Appl. No.: 707,432

[22] Filed: Jul. 21, 1976

[30] Foreign Application Priority Data

Aug. 28, 1975 [DE] Fed. Rep. of Germany ....... 2538281

[51] Int. Cl.² ............................................. C08L 39/04
[52] U.S. Cl. ................... 260/29.6 WB; 260/29.6 WQ
[58] Field of Search ............. 260/29.6 WB, 29.6 WQ

[56] References Cited

U.S. PATENT DOCUMENTS

| 3,799,902 | 3/1974 | Anderson | 260/29.6 WB |
| 3,806,485 | 4/1974 | Frisque | 260/29.6 WQ |
| 3,873,487 | 3/1975 | Minato et al. | 260/29.6 WB |
| 3,979,349 | 9/1976 | Fink et al. | 260/29.6 WQ |

Primary Examiner—M. J. Welsh
Attorney, Agent, or Firm—Keil, Thompson & Shurtleff

[57] ABSTRACT

Mixtures of high molecular weight polyacrylamides in the form of a water-in-oil polymer dispersion and containing in the inner phase from 99.99 to 95% w/w of a cationic polyacrylamide and from 0.01 to 5% w/w of an anionic polyacrylamide or from 99.99 to 95% w/w of an anionic polyacrylamide and from 0.01 to 5% w/w of a cationic polyacrylamide, all percentages being based on the total amount of polymer. The said polymer mixtures are particularly effective retention aids and flocculants and are preferably used in the manufacture of paper as pulp additives.

6 Claims, No Drawings

RETENTION AIDS AND FLOCCULANTS BASED ON POLYACRYLAMIDES

This invention relates to retention aids and flocculants based on high molecular weight polyacrylamides.

It is known to use high molecular weight polyacrylamides and copolymers of acrylamide with acrylic acid or basic comonomers such as diethylaminoethyl acrylate as retention aids and flocculants. The polymers are mainly used in the form of aqueous solutions. Even low concentrations of the polymer give highly viscous aqueous solutions. German Pat. No. 1,089,173 discloses the manufacture of water-in-oil dispersions containing acrylamide polymers, this being achieved by polymerizing a water-in-oil emulsion of an aqueous solution of acrylamide, possibly containing other water-soluble ethylenically unsaturated monomers, in a hydrophobic organic dispersion medium with the aid of polymerization initiators. According to the teaching of said patent, either cationic or anionic water-in-oil dispersions are prepared. Commercial water-in-oil dispersions contain from about 20 to 40 percent by weight of polymer.

When anionic and cationic aqueous solutions of high molecular weight polyelectrolytes are combined, binding of the ions between the oppositely charged polyelectrolytes takes place with the result that such solutions gel.

It is an object of the present invention to provide retention aids and flocculants based on high molecular weight polyacrylamides and having improved efficiency.

In accordance with the invention, this object is achieved by a water-in-oil polymer dispersion containing in the inner phase
(a) from 99.99 to 95% w/w of a cationic polyacrylamide and from 0.01 to 5% w/w of an anionic polyacrylamide or
(b) from 99.99 to 95% w/w of an anionic polyacrylamide and from 0.01 to 5% w/w of a cationic polyacrylamide, the above percentages being based on the total amount of polymer in the solid phase.

Unlike aqueous solutions of the mixtures of cationic and anionic polymers, the mixtures of the invention containing oppositely charged polymers in the form of water-in-oil dispersions are stable.

The water-in-oil dispersions of the cationic and anionic polyacrylamide are prepared separately in conventional manner, for example according to the teaching of German Pat. No. 1,089,173 or German Laid-Open Application DOS No. 2,226,143.

By cationic polyacrylamides we mean copolymers of acrylamide with from 10 to 90% by weight of a cationic ethylenically unsaturated monomer which is copolymerizable with acrylamide. Cationic monomers are, for example, esters of amino alcohols and $C_{3-5}$ ethylenically unsaturated carboxylic acids, amides of said carboxylic acids derived from diamines, N-vinylimidazole and vinylpyridine. Specific examples of cationic monomers are: dimethylaminoethyl acrylate, diethylaminoethyl acrylate, dimethylaminoethyl methacrylate, dibutylaminoethyl methacrylate, dimethylaminomethyl acrylate, dimethylaminomethyl methacrylate, diethylaminopropyl acrylate and diethylaminopropyl methacrylate. The said monomers may be copolymerized with acrylamide in neutralized or quaternized form.

By anionic polyacrylamides we mean copolymers of acrylamide containing from 10 to 90% by weight of an anionic ethylenically unsaturated monomer in the form of polymerized units. Anionic comonomers are, for example, $C_{3-5}$ ethylenically unsaturated carboxylic acids, for example acrylic acid, methacrylic acid, and dicarboxylic acids such as maleic acid and fumaric acid, acrylamidopropanesulfonic acid, vinylsulfonic acid, vinyllactic acid, half-esters of ethylenically unsaturated dicarboxylic acids and the alkali metal and/or ammonium salts of said carboxylic acids.

In addition to the said water-soluble ethylenically unsaturated compounds, up to about 20% by weight of monomers showing only a limited water solubility may be contained in both the anionic and the cationic polyacrylamides. Examples of such monomers are methyl acrylate, methyl methacrylate, butyl acrylate, dimethyl maleate, acrylonitrile and methacrylonitrile.

The molecular weights of the anionic and cationic polyacrylamides may vary within wide limits, for example from 10,000 to $25 \times 16^6$. We prefer to use polymers having a molecular weight of more than 1 million.

The mixtures of water-in-oil dispersions of the invention are obtained by mixing a cationic water-in-oil dispersion of a polyacrylamide with an anionic water-in-oil dispersion of a polyacrylamide in the ratio given above, i.e. a water-in-oil dispersion of an anionic polyacrylamide is stirred together with a water-in-oil dispersion of a cationic polyacrylamide.

The mixtures of water-in-oil dispersions of polyacrylamides of the invention are useful for a number of applications. For example, they may be used as flocculants for clarifying aqueous systems and they may be used in the papermaking industry, in the treatment of communal and industrial waste waters, as dispersing agents and protective colloids for drilling muds and as auxiliaries in the secondary recovery of crude oil in flooding waters. The amount of polymer used is from 0.002 to 0.1%, by weight of the solids.

The invention is further illustrated with reference to the following Examples, in which the parts and percentages are by weight. The K values of the polymers were determined by the method proposed by H. Fikentscher in Cellulosechemie 13, 58–64 and 71–74 (1932) in a concentration of 0.1% by weight in 5% aqueous common salt solution at a temperature of 25° C. $K = k \times 10^3$.

Preparation of a cationic water-in-oil polyacrylamide dispersion (dispersion A)

The following ingredients are mixed in a container provided with a stirrer, thermometer and an inlet and outlet for nitrogen: 347 parts of a mixture of 84% of saturated aliphatic hydrocarbons and 16% of naphthenic hydrocarbons (boiling point of the mixture 192° to 254° C), 53.5 parts of sorbitan monooleate and 20 parts ethoxylated nonylphenol (degree of ethoxylation 8 to 12).

There is then added a solution of 137.5 parts of acrylamide and 60.5 parts of diethylaminoethyl acrylate in 384.5 parts of water, the pH of which has been adjusted to 4.0 with 17.5 parts of sulfuric acid. The organic phase is mixed with the aqueous solution by thorough stirring to give a water-in-oil emulsion. Nitrogen is then passed over the emulsion for 30 minutes and the latter is then heated to a temperature of 60° C within 15 minutes. At this temperature, there is then added a solution of 0.212 part of 2,2'-azo-bis-isobutyronitrile in a little acetone and the temperature of the mixture is maintained at 60° C for 3 hours. There is obtained a coagulate-free dispersion which is stable to sedimentation and in which the polymer consists of 65% of acrylamide and 35% of diethylaminoethyl acrylate (as sulfate) and has a K value of 196.9.

Preparation of an anionic water-in-oil polyacrylamide dispersion (dispersion B)

In the manner described for the preparation of dispersion A, 20 parts of ethoxylated nonylphenol (degree of ethoxylation 8 to 12) and 53.3 parts of sorbitan monooleate are dissolved in 347 parts of a mixture of 84% of saturated aliphatic hydrocarbons and 16% of naphthenic hydrocarbons (boiling range of the mixture 192° to 254° C). There is then added a solution of 133.6 parts of acrylamide and 59 parts of acrylic acid in 389.4 parts of water, the pH of which has been adjusted to 8.0 with 18 parts of sodium hydroxide, and the aqueous solution is emulsified in the hydrocarbon oil. Nitrogen is passed over the mixture for 30 minutes and the mixture is then heated to a temperature of 60° C over 15 minutes. At this temperature, a solution of 0.212 part of 2,2'-azo-bis-isobutyronitrile in a little acetone is added. Polymerization is complete after heating the mixture for 3 hours at 60° C. There is obtained a coagulate-free sedimentation-stable dispersion of a copolymer of 35% of acrylamide and 65% of sodium acrylate. The K value of the polymer is 247.5.

The water-in-oil dispersion mixtures described in the following Examples were prepared by simply stirring dispersion A and dispersion B together.

EXAMPLE 1

This Example illustrates the effectiveness of the individual dispersions A and B (Comparative Example) and the effectiveness of the mixtures of dispersions A and B as auxiliaries for improving the retention of fillers and for increasing freeness in the manufacture of paper.

Starting from a standardized cellulose pulp (80% of bleached sulfite, 20% of china clay × 1), the retention effect of the products was determined for two different amounts of added alum as a function of the ratio of dispersion A to dispersion B by gravimetric ash assessment of a sheet of paper. The amount of product added was 0.015% of polymer, based on the cellulose fibers. The polymer addition took place in aqueous solution, this solution having been prepared from the mixture of water-in-oil dispersions. Furthermore, the dehydration acceleration of material consisting of 100% of wastepaper at a pH of 7 (without alum) and a pH of 4.8 (1.5% of alum) in terms of the change in freeness according to Schopper-Riegler (°S.R.) as a function of the ratio of dispersion A to dispersion B at an addition of 0.04%. The results are listed in Table I below.

Table I

| Ratio | | Retention Test (% of ash) | | Dehydration Test Increase in freeness (° SR) | |
|---|---|---|---|---|---|
| Dispersion A (cationic) | Dispersion B (anionic) | 0.5% of alum (pH 6) | 1.5% of alum (pH 4.8) | no alum (pH 7) | 1.5% of alum (pH 4.8) |
| no auxiliary | | | | 0 | 0 |
| 100.0 | 0.0 | 8.3 | 10.3 | 5 | 15 |
| 99.8 | 0.2 | 10.8 | 12.6 | 12 | 19 |
| 99.6 | 0.4 | 9.7 | 12.1 | 12 | 18 |
| 99.4 | 0.6 | 10.0 | 12.3 | 11 | 18 |
| 99.2 | 0.8 | 9.2 | 11.3 | 11 | 18 |
| 99.0 | 1.0 | 10.1 | 11.9 | 11 | 18 |
| 98.8 | 1.2 | 9.7 | 11.3 | 10 | 19 |
| 98.6 | 1.4 | 10.2 | 10.5 | 8 | 17 |
| 98.4 | 1.6 | 9.7 | 11.2 | 10 | 19 |
| 98.2 | 1.8 | 8.3 | 11.7 | 10 | 17 |
| 98.0 | 2.0 | 8.7 | 10.7 | 9 | 17 |
| 95.0 | 5.0 | 8.3 | 9.5 | 6 | 11 |
| 90.0 | 10.0 | 6.1 | 6.8 | 2 | 6 |
| 0 | 100.0 | 7.9 | 5.8 | 11 | 7 |

Under these test conditions, which correspond to the test method used in the paper industry, the mixtures of the invention containing cationic water-in-oil polyacrylamide dispersions with a little anionic water-in-oil polyacrylamide dispersion show, in a range in which up to 5% by weight of the anionic dispersions are added to the cationic dispersion, a distinct synergistic effect which was not to be expected from the effect of the individual ingredients of the mixture.

EXAMPLE 2

This Example illustrates the synergistic effect of the mixtures of polymer dispersions A and B of the invention in comparison with the individual dispersions A and B when used as auxiliaries for improving the sedimentation of cellulose fibers. The aqueous solutions of the polymer dispersions were prepared by diluting the water-in-oil dispersion with water with the addition of 2% by weight of ethoxylated nonylphenol (degree of ethoxylation 8 to 12) by the process of German Published Application DAS No. 2,154,081.

1,000 ml of an aqueous 0.125% cellulose suspension (well-beaten solid phase consisting of wastepaper composed of 80% of magazines and 20% of newspapers) was mixed with 0.8% of polymer, based on the cellulose fibers, in a 1,000 ml graduated cylinder at two different pH's. The polymer addition took place in aqueous solution, which solution had been prepared from the mixtures of water-in-oil dispersions.

The polymer was then dispersed thoroughly throughout the mixture by shaking. The cellulose fibers were then allowed to settle. After a period of 6 minutes, the level of the boundary between the sedimented phase and the clear phase above was recorded. In addition, an Elko III was used to measure the percentage translucency of the said clear phase in comparison with pure water. The results are listed in Table II below.

Table II

| Ratio | | Sedimentation Level of Boundary between sedimented phase and clear phase in % of original value | | Translucency of clear phase in % of pure water = 100% | |
| --- | --- | --- | --- | --- | --- |
| Dispersion A (cationic) | Dispersion B (anionic) | pH 6 | pH 7 | pH 6 | pH 7 |
| no auxiliary | | 98 | 98 | 7 | 6 |
| 0.0 | 100.0 | 69 | 75 | 28 | 55 |
| 0.2 | 99.8 | 50 | 70 | 41.5 | 60.5 |
| 0.4 | 99.6 | 56 | 61 | 37 | 58 |
| 0.6 | 99.4 | 50 | 60 | 36 | 62 |
| 0.8 | 99.2 | 55 | 54 | 41 | 59 |
| 1.0 | 99.0 | 51 | 53 | 39.5 | 58 |
| 1.2 | 98.8 | 54 | 54 | 36.5 | 58.5 |
| 1.4 | 98.6 | 52 | 59 | 43 | 59 |
| 1.6 | 98.4 | 50 | 65 | 40 | 59 |
| 1.8 | 98.2 | 50 | 59 | 40 | 60.5 |
| 2.0 | 98.0 | 58 | 58 | 36 | 59 |
| 100.0 | 0 | 93 | 95 | 23.5 | 25.5 |

The results of Table II indicate the superior synergistic effect of the mixture of anionic dispersion containing a little cationic polyacrylamide water-in-oil dispersion on the rate of sedimentation of cellulose fibers. A high rate of sedimentation of cellulose fibers is important in the clarification of waste waters from paper mills. The Table also shows that the translucency of the clear phase formed during sedimentation is improved when using the mixtures of dispersions A and B of the invention over the use of the individual dispersions A and B.

We claim:

1. A mixed polyacrylamide composition with improved retention aid and flocculant properties, said composition consisting essentially of a mixture of cationic and anionic polyacrylamides in the form of a water-in-oil polymer dispersion containing, in the inner phase, 99.99 to 95% by weight of one of said polyacrylamides and from 0.01 to 5% by weight of the other of said polyacrylamides, said percentages of cationic and anionic polyacrylamides adding up to 100, the cationic polyacrylamide being a copolymer of acrylamide containing from 10 to 90% by weight of a comonomer selected from the group consisting of esters of amino alcohols and $C_{3-5}$ ethylenically unsaturated carboxylic acids, amides of said carboxylic acids derived from diamines, N-vinylimidazoles and vinylpyridine, said comonomers being in neutralized or quaternized form, and the anionic polyacrylamide being a copolymer of acrylamide with from 10 to 90% by weight of at least one $C_{3-5}$ ethylenically unsaturated carboxylic acid.

2. The composition as claimed in claim 1, wherein the cationic polyacrylamide is a copolymer of acrylamide with from 10 to 90% by weight of an ester of an amino alcohol with acrylic acid.

3. The composition as claimed in claim 1, wherein the cationic polyacrylamide is a copolymer containing from 10 to 90% by weight of an amide derived from a diamine and acrylic acid.

4. The composition as claimed in claim 1, wherein the anionic polyacrylamide is a copolymer of acrylamide with from 10 to 90% by weight of acrylic acid.

5. The composition as claimed in claim 1 wherein the cationic polyacrylamide is a copolymer of acrylamide with from 10 to 90% by weight of diethylaminoethyl acrylate.

6. The composition as claimed in claim 5 wherein the anionic polyacrylamide is a copolymer of acrylamide with from 10 to 90% by weight of acrylic acid.

* * * * *